United States Patent
Yamori (10) Patent No.: US 11,110,713 B2
(45) Date of Patent: Sep. 7, 2021

(54) TRANSFER DEVICE CONFIGURED TO TRANSFER LIQUID FROM CONTAINER WITH BAG PORTION

(71) Applicant: RISO KAGAKU CORPORATION, Tokyo (JP)

(72) Inventor: Takehiro Yamori, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 16/791,278

(22) Filed: Feb. 14, 2020

(65) Prior Publication Data

US 2020/0269588 A1     Aug. 27, 2020

(30) Foreign Application Priority Data

Feb. 27, 2019     (JP) .............................. JP2019-033835

(51) Int. Cl.
*B41J 2/175*     (2006.01)
*B41J 2/005*     (2006.01)
*B41J 2/01*      (2006.01)
*C09D 11/322*    (2014.01)

(52) U.S. Cl.
CPC ......... *B41J 2/17513* (2013.01); *B41J 2/0057* (2013.01); *B41J 2002/012* (2013.01); *C09D 11/322* (2013.01)

(58) Field of Classification Search
CPC .................. B41J 2/17513; B41J 2/0057; B41J 2002/012; B41J 2002/17516; B41J 2/17596; B41J 2/175; C09D 11/322
USPC ............................................. 347/85, 86, 101
See application file for complete search history.

(56) References Cited

U.S. PATENT DOCUMENTS

| | | | |
|---|---|---|---|
| 2002/0012030 A1* | 1/2002 | Okamoto | B41J 2/17556 347/85 |
| 2003/0132980 A1* | 7/2003 | Yamazaki | B41J 2/17509 347/19 |

FOREIGN PATENT DOCUMENTS

JP     2017-065077     4/2017

* cited by examiner

*Primary Examiner* — Huan H Tran
*Assistant Examiner* — Alexander D Shenderov
(74) *Attorney, Agent, or Firm* — Greenblum & Bernstein, P.L.C.

(57) ABSTRACT

A transfer device includes: a first container including a bag portion configured to house liquid; a second container configured to house the liquid transferred from the first container; a transfer unit configured to transfer the liquid from the first container to the second container; and a controller configured to control the transfer unit to intermittently and repeatedly execute a transfer operation of starting transfer of the liquid and then completing the transfer before a side of the bag portion toward the transfer unit transitions to a suction contact state upon transferring the liquid from the first container to the second container.

9 Claims, 6 Drawing Sheets

TRANSFER DEVICE CONFIGURED TO TRANSFER LIQUID FROM CONTAINER WITH BAG PORTION

CROSS REFERENCE TO RELATED APPLICATION

This application is based upon and claims the benefit of priority from the prior Japanese Patent Application No. 2019-033835, filed on Feb. 27, 2019, the entire contents of which are incorporated herein by reference.

BACKGROUND

1. Technical Field

The disclosure relates to a transfer device configured to transfer liquid.

2. Related Art

An inkjet printing apparatus sometimes uses pigment ink. When the pigment ink is left at rest, sedimentation of pigment particles may occur in the pigment ink. The sedimentation of pigment particles is likely to occur particularly in ink containing pigment with large specific gravity such as metal particles.

The sedimentation of pigment particles in the ink may lead to ejection failures in an inkjet head due to an increase in viscosity of the ink. Moreover, the sedimentation of pigment particles in the ink may cause variation in the concentration of the ink ejected from the inkjet head. A device disclosed in Japanese Patent Application Publication No. 2017-65077 agitates the ink to prevent such defects caused by the sedimentation of pigment particles.

In this relation, for avoiding the sedimentation of pigment particles in ink in an ink cartridge, there is known a technique of transferring the ink in the ink cartridge to a tank for agitation provided in an inkjet printing apparatus and agitating the ink in the tank.

SUMMARY

There is known an ink cartridge which houses ink in a spout pack. The spout pack is a pack in which a spout portion is attached to a flexible bag portion.

When the ink is to be transferred from the ink cartridge using the spout pack to the tank for agitation, a pump for transfer sucks the ink from the spout pack. In this case, the spout pack sometimes transitions to a state where films forming the bag portion of the spout pack come into contact with each other by the suction and no ink is discharged from the bag portion.

Once the bag portion of the spout pack transitions to the state where the films come into contact with each other by the suction and no ink is discharged therefrom, this state is not canceled even if the suction of the ink is stopped and the transfer of the ink becomes impossible. A large amount of ink is thus sometimes left in the ink cartridge which is a transfer source.

The disclosure is directed to a transfer device which can reduce liquid left in a transfer source of the liquid.

A transfer device in accordance with some embodiments includes: a first container including a bag portion configured to house liquid; a second container configured to house the liquid transferred from the first container; a transfer unit configured to transfer the liquid from the first container to the second container; and a controller configured to control the transfer unit to intermittently and repeatedly execute a transfer operation of starting transfer of the liquid and then completing the transfer before a side of the bag portion toward the transfer unit transitions to a suction contact state upon transferring the liquid from the first container to the second container.

According to the aforementioned configuration, the liquid left in the transfer source of the liquid can be reduced.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Figure 1:
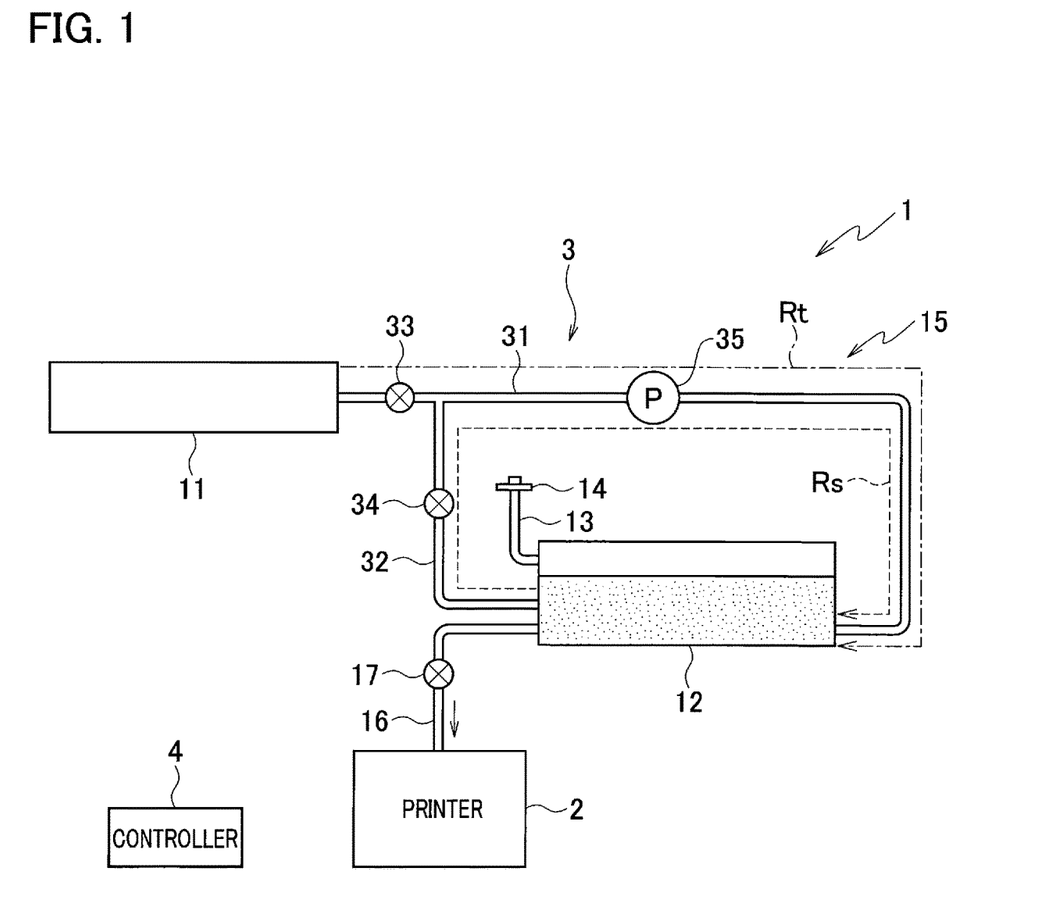
FIG. 1 is a schematic configuration diagram of a printing apparatus according to an embodiment.
Figure 2:
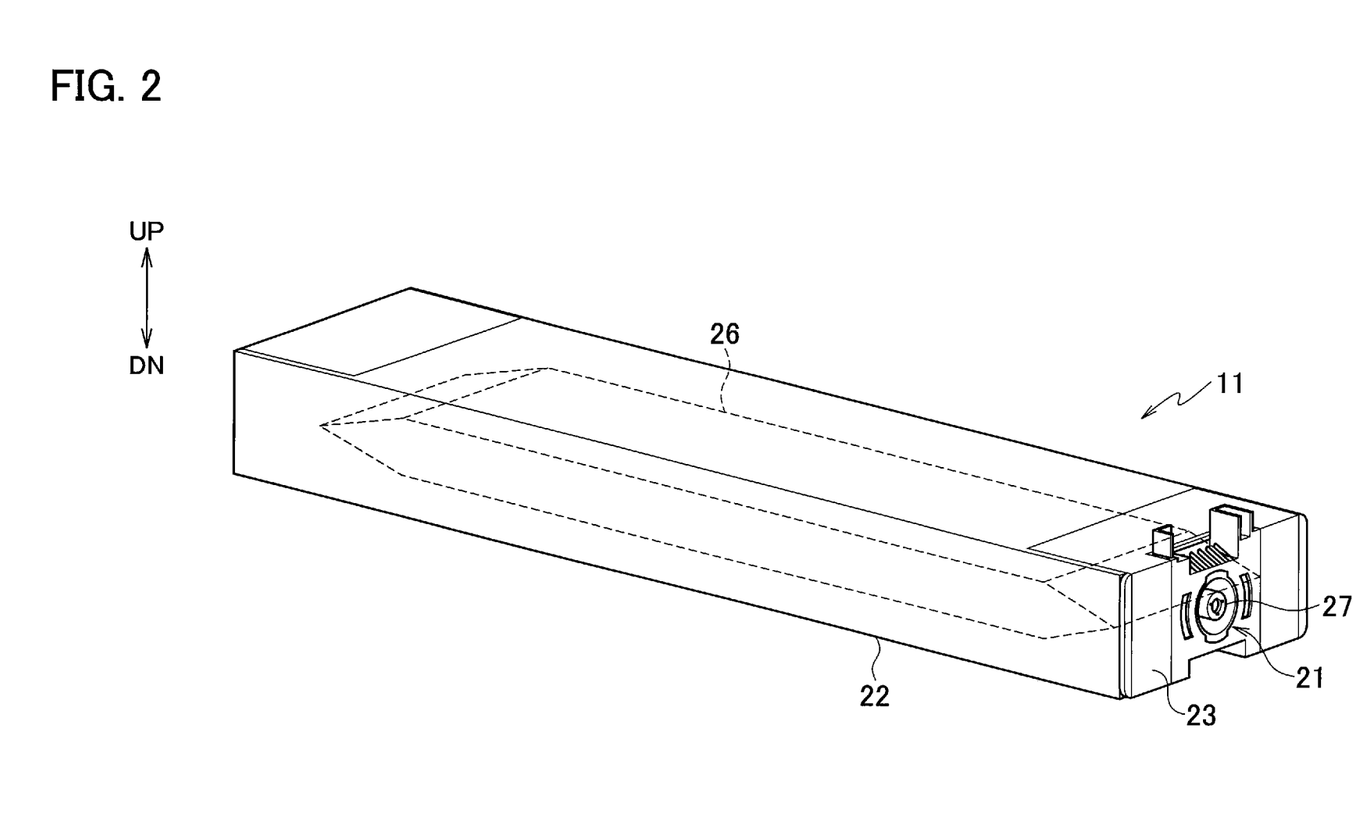
FIG. 2 is an exterior perspective view of an ink cartridge according to the embodiment.
Figure 3:
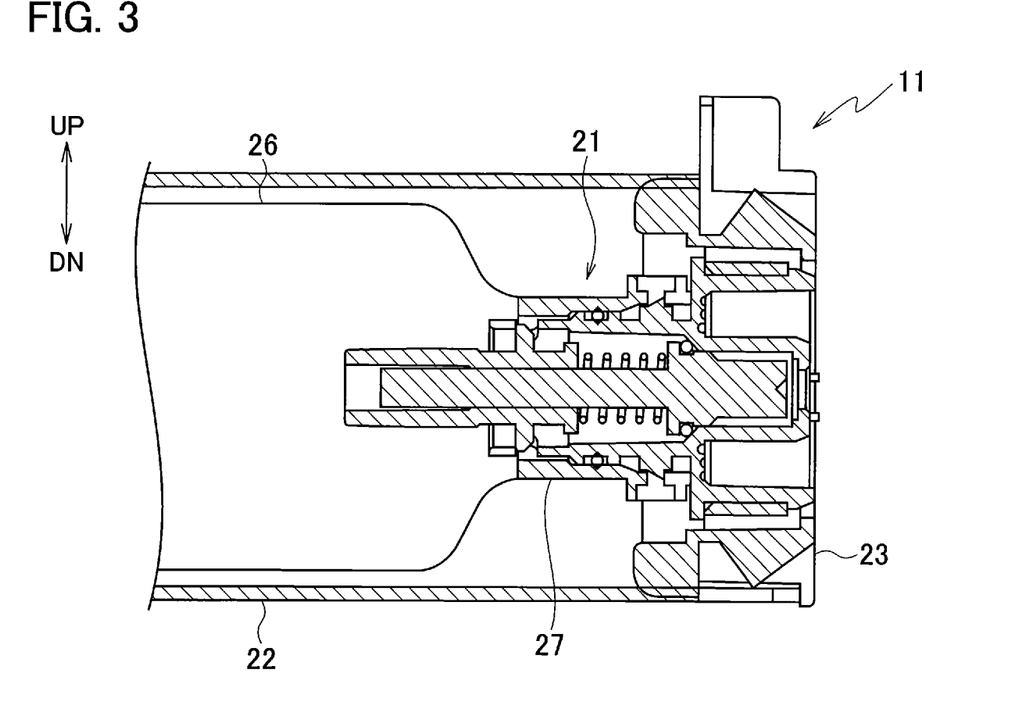
FIG. 3 is a cross-sectional view illustrating a portion of the ink cartridge according to the embodiment in an enlarged manner.
Figure 4:
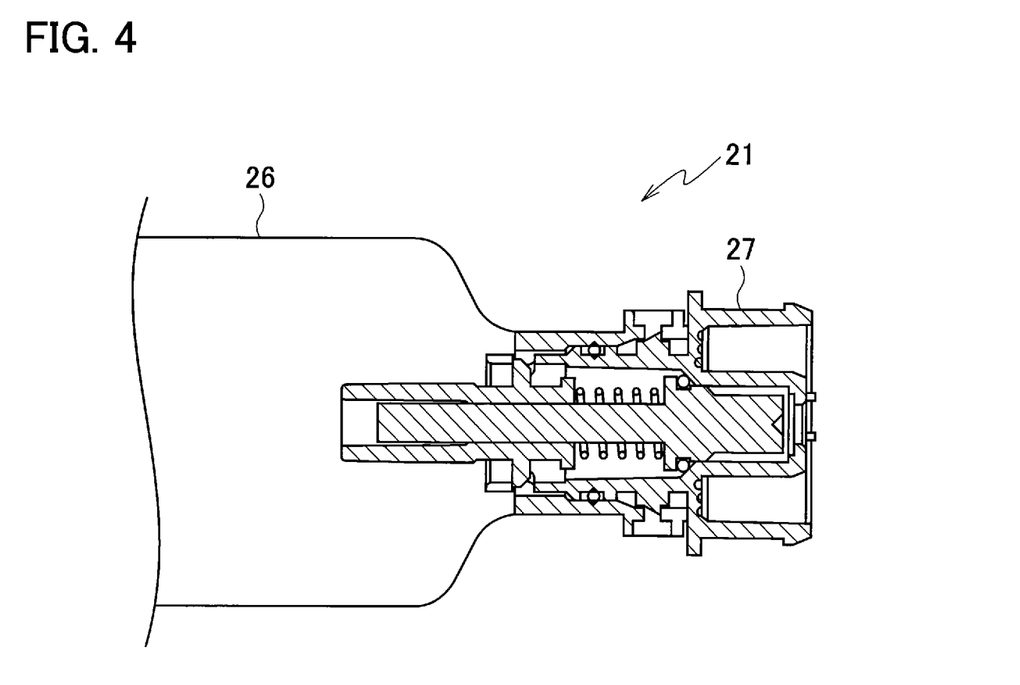
FIG. 4 is a cross-sectional view illustrating a portion of an ink pack in the ink cartridge according to the embodiment in an enlarged manner.

FIG. 1 is a schematic configuration diagram of a printing apparatus provided with a transfer device according to an embodiment of the present invention. FIG. 2 is an exterior perspective view of an ink cartridge to be loaded into the printing apparatus illustrated in FIG. 1. FIG. 3 is a cross-sectional view illustrating a portion of the ink cartridge in an enlarged manner. FIG. 4 is a cross-sectional view illustrating a portion of an ink pack in the ink cartridge in an enlarged manner. Upward and downward directions are denoted respectively by UP and DN in FIGS. 2, 3, 6A, 6B, and 6C.

As illustrated in FIG. 1, the printing apparatus 1 according to the embodiment includes a printer 2, an ink supplier 3, and a controller 4. Note that part (ink cartridge 11, tank 12, and transfer agitation unit 15 to be described later) of the ink supplier 3 and the controller 4 form the transfer device.

The printer 2 includes an inkjet head (not illustrated) and prints an image by ejecting ink from the inkjet head to a sheet.

The ink supplier 3 agitates the ink (liquid) and supplies the ink to the printer 2. The ink supplier 3 includes the ink cartridge (first container) 11, the tank (second container) 12, an atmosphere opening pipe 13, an air filter 14, the transfer agitation unit (transfer unit) 15, an ink supply pipe 16, and an ink supply valve 17.

The ink used in the printing in the printing apparatus 1 is pigment ink and is ink in which sedimentation of pigment particles may occur when the ink is left at rest. For example, the ink used in the printing in the printing apparatus 1 is a Magnetic Ink Character Reader (MICR) ink containing metal particles which are magnetic bodies. The sedimentation of the pigment particles of the ink leads to defects such as ejection failure in the inkjet head and variation in the concentration of the ejected ink. Since the sedimentation of the pigment particles of the ink may have occurred in the ink cartridge 11, in the printing apparatus 1, the ink is agitated in the ink supplier 3 to avoid the sedimentation of the pigment particles if any.

The ink cartridge 11 houses the pigment ink which is the ink to be used for printing by the printer 2. The ink cartridge 11 is configured to be detachably attached to a cartridge attachment mechanism (not illustrated) provided in the printing apparatus 1.

As illustrated in FIGS. 2 and 3, the ink cartridge 11 includes an ink pack 21, an exterior body 22, and an engagement portion 23.

The ink pack 21 is formed of a spout pack. As illustrated in FIGS. 2 to 4, the ink pack 21 includes a bag portion 26 and a spout portion 27.

The bag portion 26 is a portion configured to house the ink. The bag portion 26 is formed of a long flexible bag body. The bag portion 26 in the embodiment is formed by stacking two rectangular thermoplastic films one on top of another and joining peripheries of these films by thermal welding with the spout portion 27 arranged between one ends of the films in the longitudinal direction.

The spout portion 27 is a portion for taking out the ink from the bag portion 26. The spout portion 27 is attached to one end of the bag portion 26 in the longitudinal direction. The spout portion 27 engages with the engagement portion 23.

The exterior body 22 is a body housing the ink pack 21. The exterior body 22 is formed in a hollow bottomed cuboid box shape whose one end in the longitudinal direction is open and whose other end is closed. The engagement portion 23 is fitted to the opening portion of the exterior body 22.

In this case, an up-down direction in FIGS. 2 and 3 is the vertical direction. In a state where the ink cartridge 11 is loaded in the printing apparatus 1, as illustrated in FIGS. 2 and 3, upper and lower surfaces of the exterior body 22 are horizontal.

The engagement portion 23 functions as an attachment-detachment mechanism configured to engage with the cartridge attachment mechanism when the ink cartridge 11 is loaded in the printing apparatus 1.

The tank 12 houses the ink transferred from the ink cartridge 11 for agitation.

The atmosphere opening pipe 13 forms a flow path of air which opens the tank 12 to the atmosphere. One end of the atmosphere opening pipe 13 is connected to the tank 12 and the other end communicates with the atmosphere via the air filter 14. The air filter 14 prevents dust and the like in the air from entering the atmosphere opening pipe 13.

The transfer agitation unit 15 transfers the ink from the ink cartridge 11 to the tank 12 and agitates the ink in the tank 12. The transfer agitation unit 15 includes an ink transfer pipe 31, an ink flow-out pipe 32, an ink transfer valve 33, an agitation valve 34, and a pump 35.

The ink transfer pipe 31 connects the ink cartridge 11 and the tank 12. An end of the ink transfer pipe 31 on the ink cartridge 11 side is connected to the spout portion 27 of the ink pack 21 via the cartridge attachment mechanism. The ink transfer pipe 31 forms a transfer route Rt which is a route through which the ink is transferred from the ink cartridge 11 to the tank 12.

The ink flow-out pipe 32 connects the tank 12 and the ink transfer pipe 31.

The ink flow-out pipe 32 and a portion of the ink transfer pipe 31 on the tank 12 side of a point where the ink flow-out pipe 32 is connected form an agitation route Rs. The agitation route Rs is a route through which the ink flows out from the tank 12 and returns to the tank 12.

The ink transfer valve 33 opens and closes a flow path of the ink in the ink transfer pipe 31. The ink transfer valve 33 is arranged in a portion of the ink transfer pipe 31 on the ink cartridge 11 side of the point where the ink flow-out pipe 32 is connected.

The agitation valve 34 opens and closes a flow path of the ink in the ink flow-out pipe 32.

The ink transfer valve 33 and the agitation valve 34 switch the route to be opened between the transfer route Rt and the agitation route Rs. Specifically, opening the ink transfer valve 33 and closing the agitation valve 34 sets the transfer route Rt to an opened state and the agitation route Rs to a closed state. Moreover, closing the ink transfer valve 33 and opening the agitation valve 34 sets the agitation route Rs to an opened state and the transfer route Rt to a closed state.

The pump 35 sucks the ink from the ink pack 21 of the ink cartridge 11 and transfers the ink to the tank 12 via the transfer route Rt. Moreover, the pump 35 is used to agitate the ink in the tank 12 by sending the ink such that the ink flows out from the tank 12 and returns to the tank 12 via the agitation route Rs.

The pump 35 is arranged in a portion shared by the transfer route Rt and the agitation route Rs. Specifically, the pump 35 is arranged in the portion of the ink transfer pipe 31 on the tank 12 side of the point where the ink flow-out pipe 32 is connected.

The ink supply pipe 16 connects the tank 12 and the printer 2.

The ink supply valve 17 opens and closes a flow path of the ink in the ink supply pipe 16. When the ink supply valve 17 is opened, the ink is supplied from the tank 12 to the printer 2.

The controller 4 controls operations of the units in the printing apparatus 1. The controller 4 includes a CPU, a RAM, a ROM, a hard disk drive, and the like.

Specifically, the controller 4 performs control of printing on a sheet with the printer 2 while supplying the ink from the ink supplier 3 to the printer 2. Moreover, when the liquid surface level of the ink in the tank 12 reaches or falls below a predetermined lower limit level, the controller 4 controls the transfer agitation unit 15 such that the transfer agitation unit 15 transfers the ink from the ink cartridge 11 to the tank 12. In this case, the controller 4 controls the transfer agitation unit 15 such that the transfer agitation unit 15 intermittently and repeatedly performs a transfer operation by starting the transfer of the ink from the ink cartridge 11 to the tank 12 and then by completing the transfer before the transfer agitation unit 15 side of the bag portion 26 transitions to a suction contact state. Moreover, the controller 4 controls the transfer agitation unit 15 such that the transfer agitation unit 15 performs an agitation operation of agitating the ink in the tank 12 subsequent to each transfer operation.

In this case, "the transfer agitation unit 15 side of the bag portion 26 transitions to a suction contact state" means transition to the state where the films forming the bag portion 26 come into contact with each other near the spout portion 27 by suction and no ink is discharged from the bag portion 26. Note that, in the following description, transition to this state is also referred to as "the bag portion 26 transitions to the suction contact state."

Next, operations of the printing apparatus 1 are described.

When printing is to be performed, the controller 4 causes the ink to be ejected from the inkjet head of the printer 2 to a sheet. The ink is thereby consumed and, when supplying of ink to the printer 2 becomes necessary, the controller 4 opens the ink supply valve 17. When the ink supply valve 17 is opened, the ink is supplied from the tank 12 to the printer 2 via the ink supply pipe 16. When the necessary amount of ink is supplied, the controller 4 closes the ink supply valve 17.

Supplying of the ink to the printer 2 causes the ink in the tank 12 to decrease and the liquid surface of the ink drops. When a sensor (not illustrated) detects that the liquid surface level of the ink in the tank 12 reaches or falls below the lower limit level, the controller 4 determines that there is no ink in the tank 12 and closes the ink supply valve 17.

Then, the controller 4 executes the transfer of the ink from the ink cartridge 11 to the tank 12. Operations in the transfer of the ink from the ink cartridge 11 to the tank 12 are described with reference to the flowchart of FIG. 5.

Figure 5:
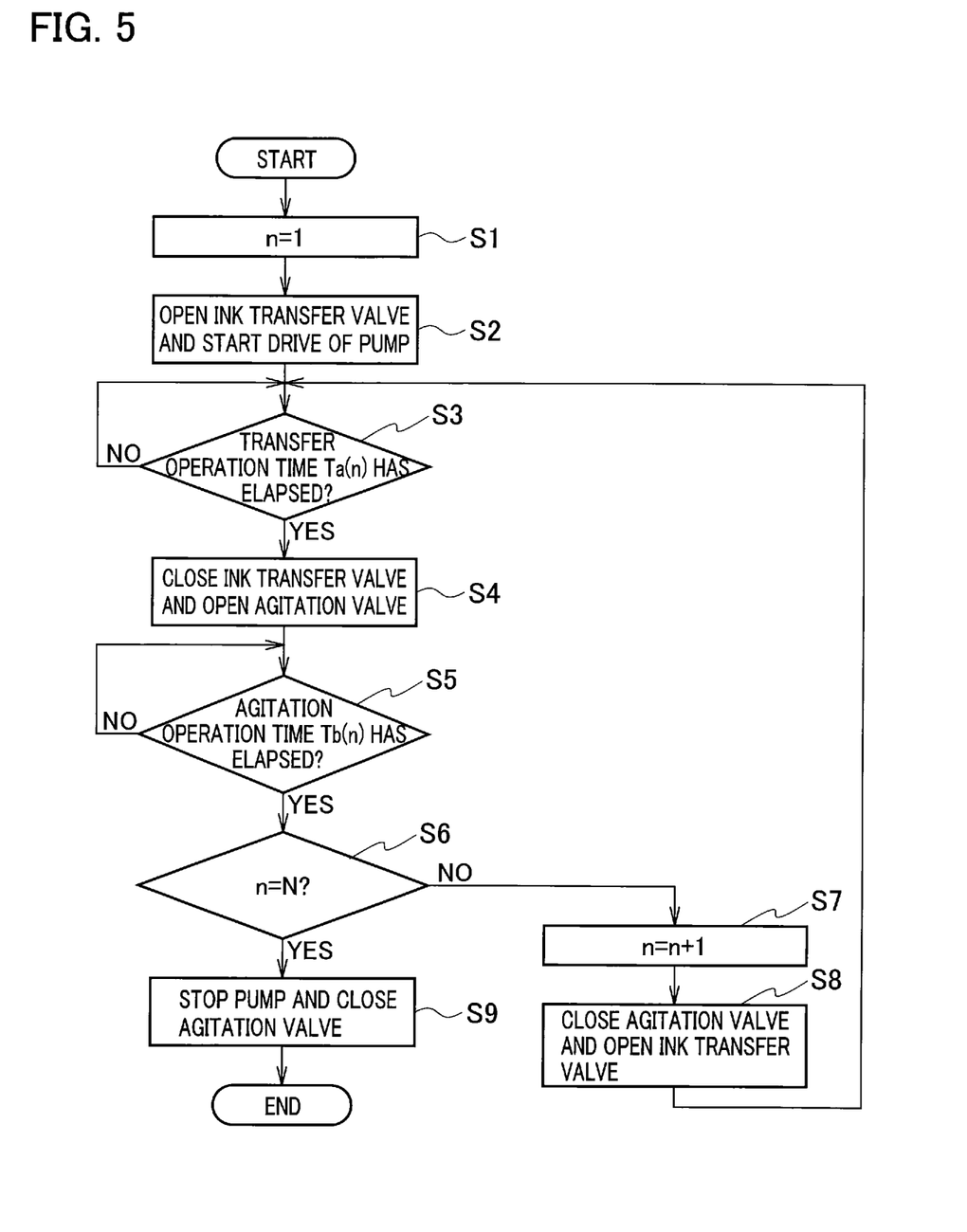
FIG. 5 is a flowchart for explaining operations in transfer of ink from the ink cartridge to a tank according to the embodiment.

In step S1 of FIG. 5, the controller 4 sets a variable n indicating the sequential number of the transfer operation and the agitation operation to "1."

Next, in step S2, the controller 4 opens the ink transfer valve 33 and starts drive of the pump 35.

In this case, in a state just before the start of the ink transfer from the ink cartridge 11 to the tank 12, the ink transfer valve 33 and the agitation valve 34 are both closed. Moreover, the new ink cartridge 11 is attached to the printing apparatus 1.

Opening the ink transfer valve 33 from the state where the ink transfer valve 33 and the agitation valve 34 are closed sets the agitation route Rs to the closed state and the transfer route Rt to the opened state. Starting the drive of the pump 35 in this state starts the first transfer operation and the ink starts to be transferred from the bag portion 26 to the tank 12 via the spout portion 27 of the ink cartridge 11. The pump 35 in the embodiment is a unit which sends the ink at a fixed liquid sending performance in the transfer operation and the agitation operation.

Next, in step S3, the controller 4 determines whether a predetermined transfer operation time Ta(n) has elapsed from the start of the n-th transfer operation. The transfer operation time Ta(n) is set in advance as time of the n-th transfer operation. The transfer operation time Ta(n) is set such that the transfer operation is completed before the bag portion 26 transitions to the suction contact state due to the sending of the ink from the bag portion 26.

In this case, when the pump 35 sucks the ink from the bag portion 26, the ink near the spout portion 27 rapidly decreases and the bag portion 26 may transition to the state where the films forming the bag portion 26 come into contact by suction and no ink is discharged from the bag portion 26, that is the suction contact state. Once the bag portion 26 transitions to the suction contact state, this state is not canceled even when the suction of the ink is stopped and no ink can be transferred. Accordingly, the transfer operation time Ta(n) is set to avoid the situation where the bag portion 26 transitions to the suction contact state.

The transfer operation time Ta(n) is set such that the transfer operation is completed at a timing just before the bag portion 26 transitions to the suction contact state to transfer as many ink as possible in one transfer operation. In this case, the smaller the amount of ink in the bag portion 26 is, the smaller the amount of ink which can be sucked before the bag portion 26 transitions to the suction contact state is. Accordingly, the transfer operation time Ta(n) is set depending on the amount of ink in the bag portion 26 at the start of the n-th transfer operation.

The smaller the amount of ink in the bag portion 26 at the start of the n-th transfer operation is, the shorter the transfer operation time Ta(n) is. Specifically, the greater the n is, the shorter the transfer operation time Ta(n) is. In other words, the smaller the n is, that is the earlier the stage at which the transfer operation is performed is, the longer the transfer operation time Ta(n) is and more ink can be transferred in one transfer operation. Note that the amount of ink in the bag portion 26 at the start of the n-th transfer operation can be calculated by subtracting the ink transfer amount in the transfer operations up to the previous transfer operation from the initial amount of ink in the bag portion 26.

When the controller 4 determines that the transfer operation time Ta (n) has not elapsed from the start of the n-th transfer operation (step S3: NO), the controller 4 repeats step S3.

When the controller 4 determines that the transfer operation time Ta(n) has elapsed from the start of the n-th transfer operation (step S3: YES), in step S4, the controller 4 closes the ink transfer valve 33 and opens the agitation valve 34. Switching to the state where the agitation route Rs is opened and the transfer route Rt is closed is thereby performed. In this case, the pump 35 is continuously driven and the ink thereby starts to be circulated through the agitation route Rs. The n-th transfer operation is thereby completed and the n-th agitation operation is started to start the agitation of the ink in the tank 12.

Next, in step S5, the controller 4 determines whether a predetermined agitation operation time Tb(n) has elapsed from the start of the n-th agitation operation.

In this case, the agitation operation time Tb(n) is set in advance as time of the n-th agitation operation. Each of the agitation operation times Tb(1) to Tb(N−1) in n=1 to (N−1) is also a transfer operation suspension time between corresponding two transfer operations. N is the number of times the transfer operation and the agitation operation are intermittently performed when the ink is transferred from the ink cartridge 11 to the tank 12. N is an integer of 2 or more.

Each of the agitation operation times Tb(1) to Tb(N−1) in n=1 to (N−1) is set as a time required for the ink pack 21 to return to the state where the next transfer operation can be executed after the completion of the corresponding one of the first to (N−1)th transfer operations.

Figure 6A:
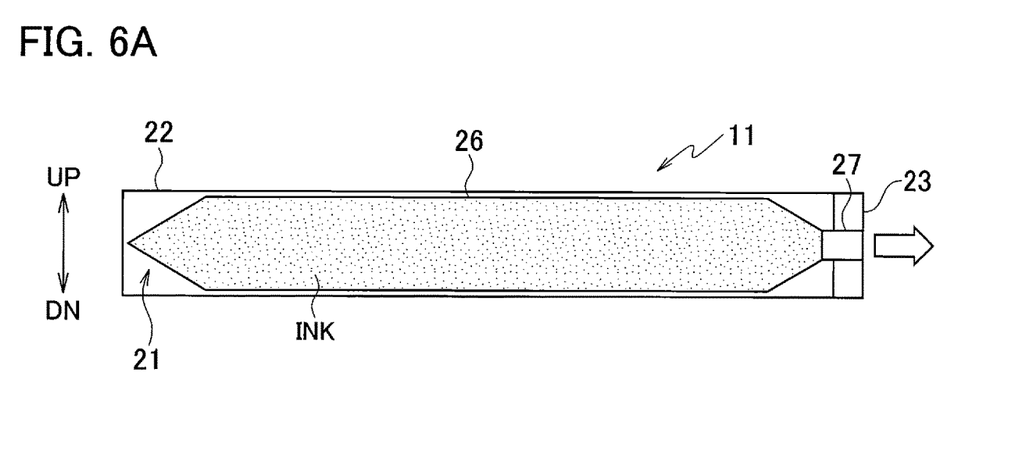
FIG. 6A is an explanatory view of a behavior of the ink in the ink pack according to the embodiment.
Figure 6B:
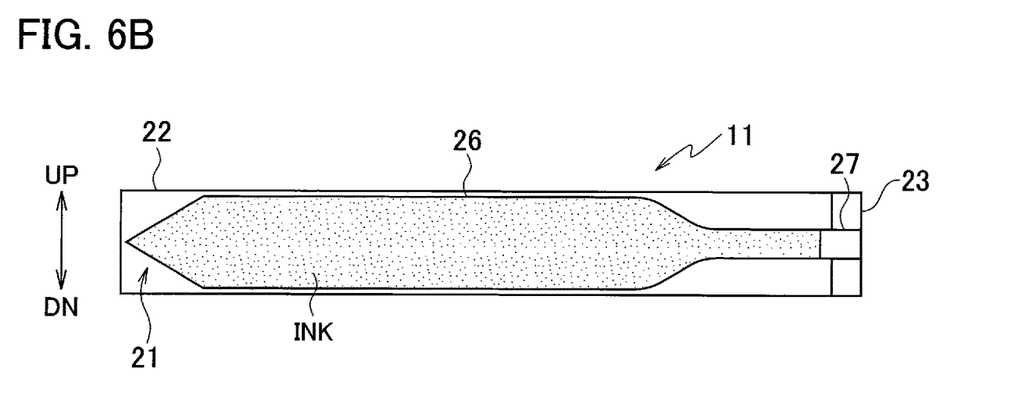
FIG. 6B is an explanatory view of a behavior of the ink in the ink pack according to the embodiment.

When the ink is sent out via the spout portion 27 in the transfer operation as illustrated in FIG. 6A, there is little ink near the spout portion 27 at the completion of the transfer operation as illustrated in FIG. 6B.

Figure 6C:
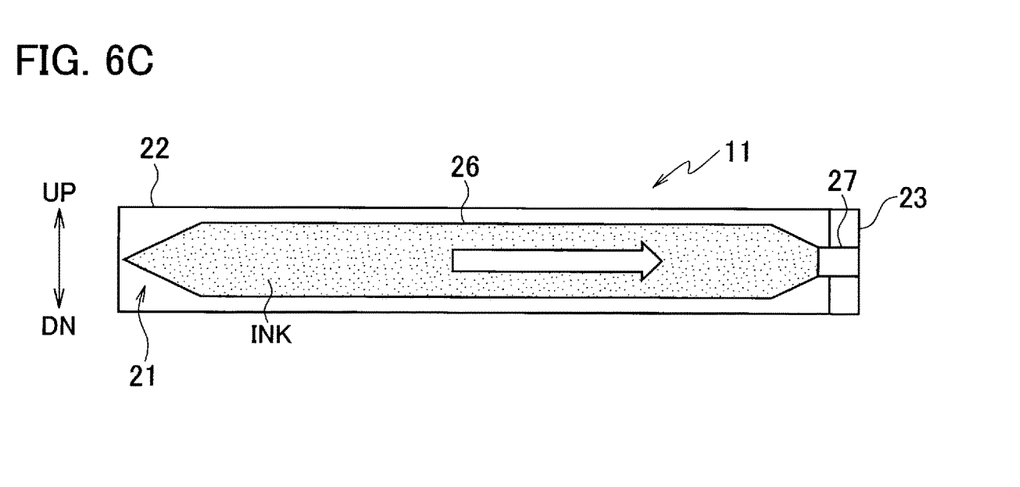
FIG. 6C is an explanatory view of a behavior of the ink in the ink pack according to the embodiment.

Meanwhile, after the completion of the transfer operation, as illustrated in FIG. 6C, the ink flows from the side away from the spout portion 27 toward the spout portion 27 such that the thickness of the bag portion 26 becomes even. The ink thereby returns to a portion near the spout portion 27 over time and the ink pack 21 transitions to the state where the next transfer operation can be executed.

The more the amount of ink in the bag portion 26 is, the shorter the time it takes for the ink pack 21 to transition from the state where there is little ink near the spout portion 27 as in FIG. 6B to the state where the next transfer operation can be executed as in FIG. 6C.

Accordingly, the agitation operation time Tb(n) in each of n=1 to (N−1) is set depending on the amount of ink in the bag portion 26. The smaller the amount of ink in the bag portion 26 is, that is the greater the n is, the longer the agitation operation time Tb(n) in each of n=1 to (N−1) is.

The last (N-th) agitation operation time Tb(N) is set so long that the ink in the tank 12 can be sufficiently agitated.

Returning to FIG. 5, when the controller 4 determines that the agitation operation time Tb(n) has not elapsed from the start of the n-th agitation operation (step S5: NO), the controller 4 repeats step S5.

When the controller 4 determines that the agitation operation time Tb(n) has elapsed from the start of the n-th agitation operation (step S5: YES), in step S6, the controller 4 determines whether the variable n is "N" indicating the last transfer operation and the last agitation operation.

When the controller 4 determines that n is not N (step S6: NO), in step S7, the controller 4 adds "1" to the variable n.

Next, in step S8, the controller 4 closes the agitation valve 34 and opens the ink transfer valve 33. Switching to the state where the agitation route Rs is closed and the transfer route Rt is opened is thereby performed and the ink starts to be transferred from the ink cartridge 11 to the tank 12 through the transfer route Rt. Specifically, the (n−1)th agitation operation is completed and the n-th transfer operation is started. Then, the controller 4 returns to step S3.

When the controller 4 determines that n is N in step S6 (step S6: YES), in step S9, the controller 4 stops the pump 35 and closes the agitation valve 34. The last (N-th) agitation operation is thereby completed and the series of operations is completed.

Figure 7:
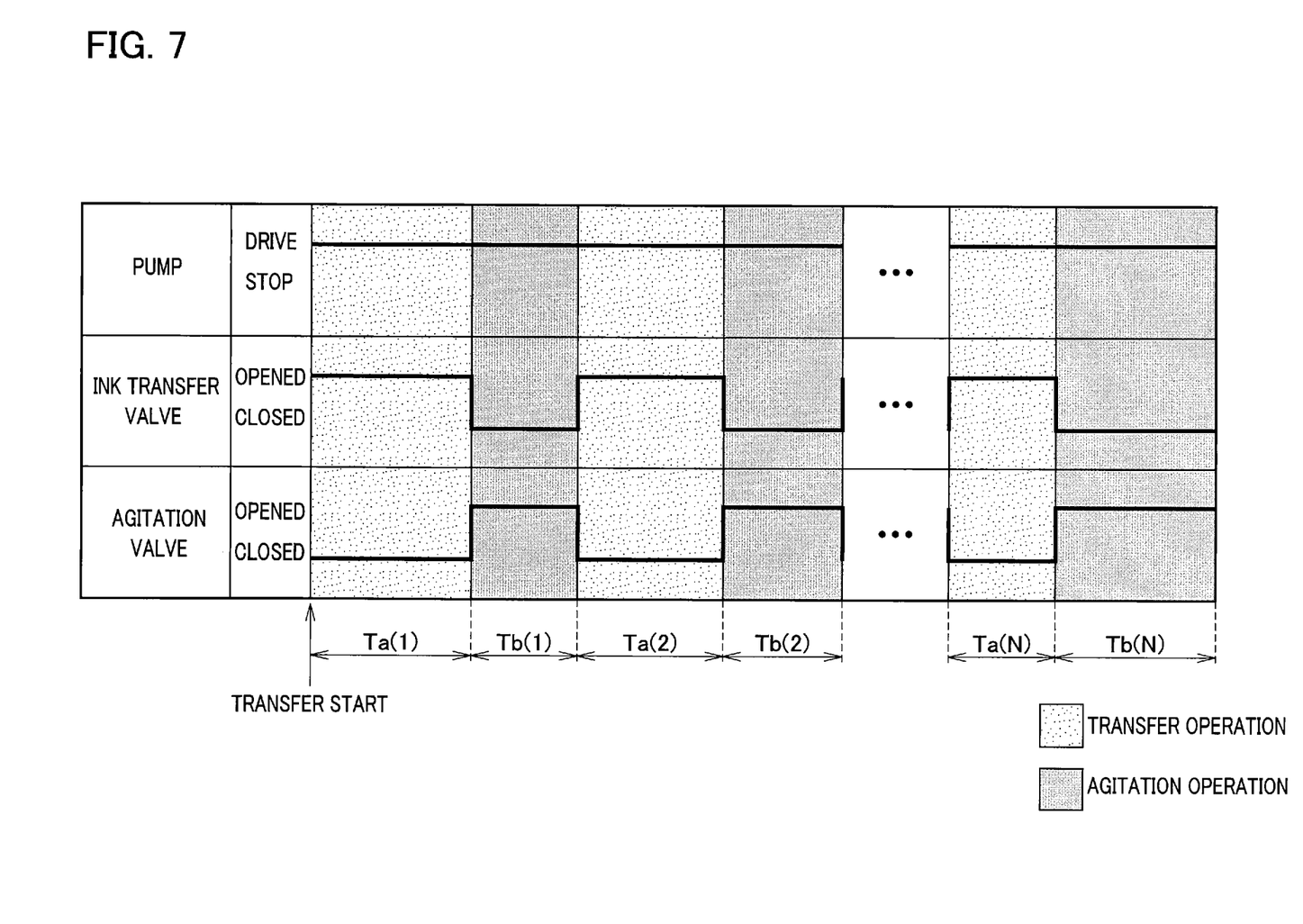
FIG. 7 is a timing chart of operations of a pump, an ink transfer valve, and an agitation valve in the processing of the flowchart of FIG. 5.

As illustrated in FIG. 7, the transfer operation is intermittently and repeatedly performed by performing the processing of the flowchart of FIG. 5 as described above. The transfer operation time Ta(n) is set such that the transfer operation is completed at the timing just before the bag portion 26 transitions to the suction contact state. Moreover, the transfer operation time Ta(n) is set such that Ta(1)>Ta(2)> . . . >Ta(N).

Moreover, the agitation operation is performed between each two successive transfer operations and after the last (N-th) transfer operation. The agitation operation times Tb(1) to Tb(N−1) which are each the transfer operation suspension time between each two successive transfer operations are set such that Tb(1)<Tb(2)< . . . <Tb(N−1).

As described above, in the printing apparatus 1, the controller 4 controls the transfer agitation unit 15 such that the transfer agitation unit 15 intermittently and repeatedly executes the transfer operation of transferring the ink from the ink cartridge 11 to the tank 12 by starting the transfer of the ink and then by completing the transfer before the bag portion 26 transitions to the suction contact state. This suppresses the case where the bag portion 26 transitions to the suction contact state and the transfer of the ink becomes impossible. Accordingly, it is possible to reduce the amount of ink left in the ink pack 21 which is the transfer source.

Moreover, in the printing apparatus 1, the controller 4 sets the transfer operation time Ta(n) of each transfer operation depending on the amount of ink in the bag portion 26 at the start of the transfer operation. This suppresses the case where the amount of ink transferred in one transfer operation is too small and the efficiency of the transfer is low. Accordingly, the time required to transfer the ink can be reduced.

Furthermore, in the printing apparatus 1, the controller 4 sets the suspension time (agitation operation times Tb(1) to Tb(N−1)) between each two successive transfer operations depending on the amount of ink in the bag portion 26 at that moment. This can suppress the case where the suspension time between each two successive transfer operations is set longer than necessary. Accordingly, the time required to transfer the ink can be further reduced.

Note that the transfer operation time Ta(n) of each transfer operation may be adjusted depending on the type of ink. Specifically, the transfer operation time Ta(n) may be adjusted such that, for example, a longer transfer operation time Ta(n) is set for the type of ink with a higher viscosity. The higher the viscosity of the ink is, the lower the flow rate of the ink sent by the pump 35 is. Accordingly, setting a longer transfer operation time Ta(n) can suppress a decrease in the amount of ink transferred in each transfer operation.

Moreover, the suspension time (agitation operation times Tb(1) to Tb(N−1)) between each two successive transfer operations may be adjusted depending on the type of ink. Specifically, the suspension time between each two successive transfer operations may be adjusted such that a longer suspension time is set for the type of ink with a higher viscosity. The higher the viscosity of the ink is, the longer the time it takes until the ink returns to the portion near the spout portion 27 where there is little ink due to the ink transfer and the ink pack 21 transitions to state where the next transfer operation can be performed. Accordingly, setting a longer suspension time between each two successive transfer operations for the type of ink with a higher viscosity can suppress the transition of the bag portion 26 to the suction contact state caused by starting the transfer operation before the ink pack 21 transitions to the state where the transfer operation can be executed.

Furthermore, although the transfer operation time Ta(n) is set depending on the amount of ink in the bag portion 26 at the start of the transfer operation in the aforementioned embodiment, the transfer operation time Ta(n) may be fixed irrespective of the amount of ink in the bag portion 26 at the start of the transfer operation.

In this case, the transfer operation time Ta(n) in each transfer operation may be set such that the transfer is completed before the bag portion 26 transitions to the suction contact state even in the last transfer operation. Moreover, in this case, the transfer operation time Ta (n) may be adjusted depending on the type of the ink or a transfer operation time Ta(n) usable irrespective of the type of ink may be set. When the transfer operation time Ta(n) usable irrespective of the type of ink is set, the transfer operation time Ta(n) of each transfer operation may be set to a time in which the transfer of the ink is completed before the bag portion 26 transitions to the suction contact state even in the last transfer operation in the case where the ink in the ink cartridge 11 is a type of ink with the highest viscosity among the types of inks usable in the printing apparatus 1.

Moreover, although the suspension time between each two successive transfer operations is set depending on the amount of ink in the bag portion 26 in the aforementioned embodiment, the suspension time between each two successive transfer operations may be fixed irrespective of the amount of ink in the bag portion 26. Moreover, in this case, the suspension time between each two successive transfer operations may be adjusted depending on the type of the ink or a suspension time between each two successive transfer operations usable irrespective of the type of ink may be set. When the suspension time between each two successive transfer operations usable irrespective of the type of ink is set, the suspension time between each two successive transfer operations may be set to a suspension time in which the ink returns to the portion near the spout portion 27 where there is little ink due to the second to last transfer operation and the ink pack 21 transitions to the state where the last transfer operation can be performed in the case where the ink in the ink cartridge 11 is a type of ink with the highest viscosity among the types of inks usable in the printing apparatus 1.

Furthermore, although the example in which the agitation operation is performed between each two successive transfer operations is described in the aforementioned embodiment, it is possible to intermittently perform the transfer operations without performing the agitation operation.

Moreover, the configuration may be such that a pump capable of controlling the flow rate is used as the pump 35 and all ink in the ink pack 21 is transferred to the tank 12 by performing, instead of the intermittent transfer operations, a continuous transfer operation in which the suction contact state of the bag portion 26 is avoided by gradually reducing the flow rate of the ink.

Furthermore, although the case where the ink in which sedimentation of pigment particles occurs is agitated is described in the aforementioned embodiment, the ink to be agitated is not limited to the ink in which sedimentation of contents occurs and may be, for example, ink in which separation of contents occurs.

Moreover, although the tank 12 is described as a configuration which houses the ink transferred from the ink cartridge 11 for agitation in the aforementioned embodiment, the configuration which houses the ink for agitation is not limited to this. For example, a flexible pack may be used.

Furthermore, the present invention can be also applied to a device which transfers liquid other than ink.

The embodiment of the disclosure has, for example, the following configuration.

A transfer device includes: a first container including a bag portion configured to house liquid; a second container configured to house the liquid transferred from the first container; a transfer unit configured to transfer the liquid from the first container to the second container; and a controller configured to control the transfer unit to intermittently and repeatedly execute a transfer operation of starting transfer of the liquid and then completing the transfer before a side of the bag portion toward the transfer unit transitions to a suction contact state upon transferring the liquid from the first container to the second container.

The controller may be configured to determine time of each transfer operation depending on an amount of the liquid in the bag portion at start of the transfer operation.

The controller may be configured to determine suspension time between each two successive transfer operations depending on an amount of the liquid in the bag portion.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A transfer device comprising:
   a first container including a bag portion configured to house liquid;
   a second container configured to house the liquid transferred from the first container;
   a transfer unit configured to transfer the liquid from the first container to the second container; and
   a controller configured to control the transfer unit to intermittently and repeatedly execute a transfer operation of starting transfer of the liquid and then completing the transfer before a side of the bag portion toward the transfer unit transitions to a suction contact state upon transferring the liquid from the first container to the second container,
   wherein the controller is configured to determine a time of each transfer operation depending on a cumulative time of executed transfer operations preceding a start of each transfer operation.

2. The transfer device according to claim 1, wherein the controller is configured to determine the time of each transfer operation depending on an amount of the liquid in the bag portion at start of the transfer operation.

3. The transfer device according to claim 2, wherein the controller is configured to determine a suspension time between each two successive transfer operations depending on an amount of the liquid in the bag portion.

4. The transfer device according to claim 2, wherein the controller is configured to control a transfer agitation unit to perform an agitation operation of agitating ink in the second container subsequent to each transfer operation.

5. The transfer device according to claim 4, wherein the first container and the second container remain fluidly connected to the transfer unit during each agitation operation.

6. The transfer device according to claim 1, wherein the controller is configured to determine a suspension time between each two successive transfer operations depending on an amount of the liquid in the bag portion.

7. A transfer device comprising:
   a first container including a bag portion configured to house liquid;
   a second container configured to house the liquid transferred from the first container;
   a transfer unit configured to transfer the liquid from the first container to the second container; and
   a controller configured to control the transfer unit to intermittently and repeatedly execute a transfer operation of starting transfer of the liquid and then completing the transfer before a side of the bag portion toward the transfer unit transitions to a suction contact state upon transferring the liquid from the first container to the second container,
   wherein the controller is configured to determine a time of each transfer operation depending on an amount of the liquid in the bag portion at start of the transfer operation or a type of the liquid.

8. The transfer device according to claim 7, wherein the controller is configured to determine a suspension time between each two successive transfer operations depending on an amount of the liquid in the bag portion.

9. A transfer device comprising:
- a first container including a bag portion configured to house liquid;
- a second container configured to house the liquid transferred from the first container;
- a transfer unit configured to transfer the liquid from the first container to the second container; and
- a controller configured to control the transfer unit to intermittently and repeatedly execute a transfer operation of starting transfer of the liquid and then completing the transfer before a side of the bag portion toward the transfer unit transitions to a suction contact state upon transferring the liquid from the first container to the second container,
- wherein the controller is configured to determine a suspension time between each two successive transfer operations depending on an amount of the liquid in the bag portion.

* * * * *